US006560714B1

United States Patent
Ho et al.

(10) Patent No.: US 6,560,714 B1
(45) Date of Patent: *May 6, 2003

(54) POWER MANAGEMENT FOR A PERIPHERAL COMPONENT INTERCONNECT ENVIRONMENT WITH AUXILIARY POWER

(75) Inventors: Tan Thanh Ho, Santa Clara, CA (US); Scott William Mitchell, San Jose, CA (US); Andrew Nakao, Fremont, CA (US); Ngo Thanh Ho, San Jose, CA (US); George Kwan, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,676

(22) Filed: Dec. 3, 1999

(51) Int. Cl.$^7$ ................................................. G06F 1/26
(52) U.S. Cl. ....................................... 713/340; 713/310
(58) Field of Search .......................... 307/140; 713/340, 713/310

(56) References Cited

U.S. PATENT DOCUMENTS

| 5,436,487 | A | * | 7/1995 | Narita ........................... 257/378 |
| 5,739,597 | A | * | 4/1998 | Bailey et al. ................. 307/140 |
| 6,091,617 | A | * | 7/2000 | Moran ........................... 363/142 |
| 6,327,635 | B1 | * | 12/2001 | Alston et al. ................. 365/226 |
| 6,393,570 | B1 | * | 5/2002 | Henderson et al. .......... 713/310 |
| 6,404,077 | B1 | * | 6/2002 | Moran ............................ 307/87 |
| 6,438,429 | B1 | * | 8/2002 | Ho et al. ........................ 700/22 |

OTHER PUBLICATIONS

Advanced Micro Devices, "Magic Packet Adapter Card Implementation", Application Note, PID#21385A, Sep. 1997.*

Advanced Micro Devices, "Implementation of Magic Packet–ready Motherboard", Application Note, PID#21383B, Apr. 1997.*

Fairchild Semiconductor Datasheet, "2N7000 / 2N7002 / NDS7002A N–Channel Enhancement Mode Field Effect Transistor."*

* cited by examiner

Primary Examiner—Thomas Lee
Assistant Examiner—Albert Wang
(74) Attorney, Agent, or Firm—Wagner Murabito & Hao LLP (57) ABSTRACT

A circuit and method thereof for arbitrating between a plurality of power sources connected to a computer system peripheral device. The circuit includes a first circuit subassembly coupled to a first power source and a second power source. The first circuit subassembly conducts current from the first power source when power is not available from the second power source, and otherwise conducts current from the second power source. The circuit also includes a second circuit subassembly coupled between the first circuit subassembly and a third power source. The second circuit subassembly conducts current from the third power source when the third power source is available and otherwise conducts current from the first circuit subassembly. The second circuit subassembly comprises a first component, a second component and a third component. The first component is coupled to the third power source and the first circuit subassembly. The first component conducts current from the first circuit subassembly when power is not available from the third power source and otherwise substantially does not conduct current. The second component is coupled to the third power source and the first component. The second component conducts current from the first component when power is available from the third power source and otherwise substantially does not conduct current. The third component is coupled to the first component, the second component and the third power source. The third component conducts current from the third power source when power is available from the third power source.

26 Claims, 6 Drawing Sheets

POWER MANAGEMENT FOR A PERIPHERAL COMPONENT INTERCONNECT ENVIRONMENT WITH AUXILIARY POWER

TECHNICAL FIELD

The present invention generally pertains to the field of computer networking. More particularly, the present invention pertains to power management in a network adapter with more than one power source, such as a network adapter equipped with remote wakeup capability.

BACKGROUND ART

A computer system's functionality is dramatically enhanced by coupling stand-alone computers together to form a computer network. In a computer network, users may readily exchange files, share information stored on a common database, pool resources, and communicate via e-mail and video teleconferencing. Another advantage of computer networks is that they can be accessed from remote locations via a modem or various other types of communication equipment.

One popular type of computer network is known as a local area network (LAN). LANs connect multiple computers together such that the users of the computers can access the same information and share data. Typically, in order to be connected to a LAN, a general purpose computer requires a peripheral device generally known as a network adapter or network interface card (NIC). Essentially, the NIC works with the operating system and central processing unit (CPU) of the host computer to control the flow of information over the LAN. NICs may also be used to connect a computer to the Internet.

Remote access to a computer network (e.g., a LAN) is facilitated by providing the capability to start or wake up a computer from a remote location. This feature is advantageous to a user desiring access to a computer from a remote location. This feature is also advantageous to a network administrator, allowing the administrator to perform, for example, maintenance activities on a computer system from a remote location.

A standard has been developed for allowing a networked computer which is in sleep mode to be awakened. More specifically, Advanced Micro Devices (AMD) of Santa Clara, Calif., has developed a technology referred to as the Magic Packet technology. In the Magic Packet technology, assuming, for example, that an Ethernet controller is running and communicating with the network, the computer's power management hardware or software puts the Ethernet controller into the Magic Packet mode prior to the system going to sleep. Once in the sleep mode, the computer will be awakened when a Magic Packet is detected. That is, incoming data will be monitored until the specific sequence comprising the Magic Packet is detected. The Magic Packet technology and the associated standard (generally referred to as the Wakeon LAN standard) are well known in the art.

Accordingly, some NICs are designed to detect a Magic Packet and to awaken the computer (or selected components within the computer) in response. These NICs are typically connected in a standard fashion to the computer (e.g., to the computer's motherboard) via a bus such as a PCI (peripheral component interconnect) bus. These NICs also are connected to the motherboard via a separate cable (e.g., a remote wakeup cable). Thus, NICs that provide a remote wakeup capability typically have a primary power source from the motherboard and an auxiliary power source from the remote wakeup cable. When the computer is powered on and awake, power to the NIC is provided over the PCI bus from the primary power source, typically five volts (5V). When the computer system is in the sleep mode, power to the NIC is provided over the remote wakeup cable from the auxiliary power source, typically also 5V. Therefore, when a Magic Packet is received, the NIC will have power and hence the ability to wake up. The NIC also can then send a PME (power management event) signal via the remote wakeup cable to wake up the computer.

The prior art is problematic because the presence of more than one power source can cause a power contention issue. If power is being provided by one source (for example, by the auxiliary power source), it is not necessary for the other source (in this case, the primary power source) to provide power. In fact, using power concurrently from both sources may cause damage to some of the components in the NIC. Also, switching to different power sources during the power down mode can cause faults in the NIC.

This problem is aggravated if an additional power source is introduced. For example, revision 2.2 of the PCI specification ("PCI 2.2") requires the addition of another auxiliary power source. In accordance with PCI 2.2, pin A14 of the PCI bus provides a 3.3V auxiliary power source to the NIC. Thus, a NIC with remote wakeup capability and adapted to accommodate an additional auxiliary power source (such as that specified by PCI 2.2) can have three power sources, aggravating the power contention issue described above.

Thus, a need exists for a device or method that addresses the power contention problem so that components do not inadvertently receive power from more than one source when multiple power sources are present in a peripheral device (such as a NIC). A need also exists for a device or method that addresses the above need and can be applied to a legacy device (such as a NIC) to allow the legacy device to accommodate additional power sources (such as that specified in PCI 2.2). A further need exists for a device or method that addresses the above needs and allows the peripheral device to select one power source versus another depending on the mode in which the computer and peripheral device are currently operating (e.g., sleep mode versus awake). The present invention provides a novel solution to these needs.

DISCLOSURE OF THE INVENTION

The present invention provides a device and method thereof that address the power contention problem so that components do not inadvertently receive power from more than one source when multiple power sources are present in a peripheral device (such as a network interface card [NIC]). The present invention also provides a device and method thereof that can be applied to a legacy device (such as a NIC) to allow the legacy device to accommodate additional power sources (such as that specified in revision 2.2 of the PCI specification). The present invention also provides a device and method thereof that allow the peripheral device to select one power source versus another depending on the mode in which the computer and peripheral device are currently operating (e.g., sleep mode versus awake).

Specifically, in one embodiment of the present invention, the circuit and method thereof arbitrate between a plurality of power sources connected to a computer system peripheral device. The circuit includes a first circuit subassembly coupled to a first power source and a second power source.

The first circuit subassembly conducts current from the first power source when power is not available from the second power source, and otherwise conducts current from the second power source.

In the present embodiment, the circuit also includes a second circuit subassembly coupled between the first circuit subassembly and a third power source. The second circuit subassembly conducts current from the third power source when the third power source is available and otherwise conducts current from the first circuit subassembly. The second circuit subassembly comprises a first component, a second component and a third component.

In the present embodiment, the first component is coupled to the third power source and the first circuit subassembly. The first component conducts current from the first circuit subassembly when power is not available from the third power source and otherwise substantially does not conduct current. The second component is coupled to the third power source and the first component. The second component conducts current from the first component when power is available from the third power source and otherwise substantially does not conduct current. The third component is coupled to the first component, the second component and the third power source. The third component conducts current from the third power source when power is available from the third power source.

In one embodiment, a fourth component is coupled to the first component, the second component and the first circuit subassembly. The fourth component conducts current from the first circuit subassembly when power is available from the third power source and otherwise substantially does not conduct current. Also, a fifth component is coupled to the second component and the fourth component. The fifth component conducts current from the fourth component when power is not available from the third power source and otherwise substantially does not conduct current. In addition, a sixth component is coupled to the fourth component and the first circuit subassembly. The sixth component conducts current from the first circuit subassembly when power is not available from the third power source and otherwise substantially does not conduct current.

In one embodiment, the first circuit subassembly includes a seventh component coupled between the first (e.g., primary) power source and the second (e.g., auxiliary) power source. The seventh component conducts current from the first power source when power is not available from the second power source. An eighth component integral with the seventh component conducts current from the first power source in combination with the seventh component and substantially prevents current from flowing from the second power source to the first power source. Thus, in this embodiment, power from the second power source is used when power is available from the second power source, and otherwise power from the first power source is used.

In one embodiment, the first component, second component, third component, fourth component, fifth component and sixth component are transistors, specifically, field effect transistors (FETs). In one embodiment, the seventh component is a FET and the eighth component is a diode.

In one embodiment, the first power source is a five volt (5V) source connected to the peripheral device via a peripheral component interconnect (PCI) bus, the second power source is an auxiliary 5V source connected to the peripheral device via a remote wakeup cable, and the third power source is an auxiliary 3.3V source connected to the periph-eral device substantially in accordance with PCI specification revision 2.2.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," "conducting," "using" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1:
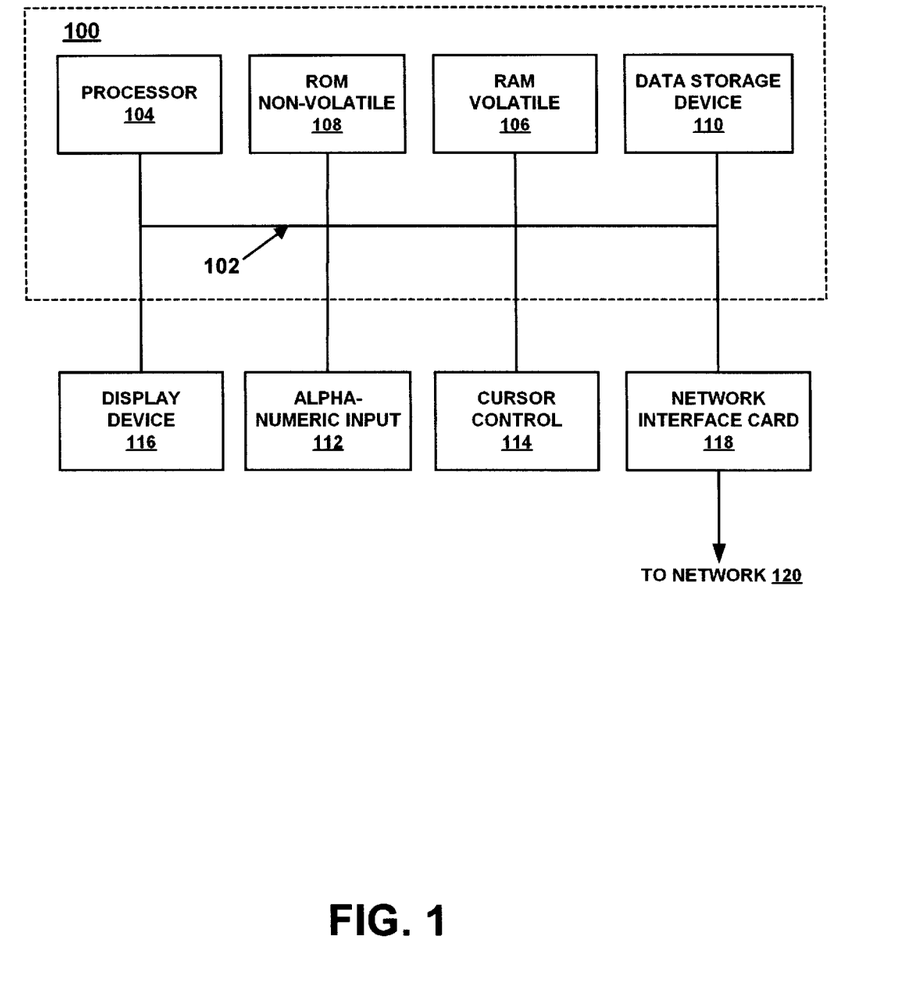
FIG. 1 is a block diagram of an exemplary computer system in accordance with one embodiment of the present invention.

FIG. 1 illustrates an exemplary computer system 100 upon which embodiments of the present invention may be practiced. The computer system 100 is used in combination with a peripheral component to perform the present method in accordance with one embodiment of the present invention. It is appreciated that system 100 is exemplary only and that the present invention can operate within a number of different computer systems including general purpose networked computer systems, embedded computer systems, and stand alone computer systems. Additionally, computer system 100 is well adapted to having computer readable media such as, for example, a floppy disk, a compact disc, and the like coupled thereto. Such computer readable media is not shown coupled to computer system 100 in FIG. 1 for purposes of clarity.

Computer system 100 includes an address/data bus 102 for communicating information. In the present embodiment, bus 102 is a PCI (peripheral component interconnect) bus substantially compliant with revisions 2.1 and 2.2 of the PCI specification. Accordingly, the discussion herein is in the context of a PCI bus; however, it is appreciated that various other types of buses can be used in accordance with the present invention. It is further appreciated that other revisions of the PCI specification may be utilized with the present invention. Additional information regarding bus 102 is provided below in conjunction with FIG. 3.

Continuing with reference to FIG. 1, central processor unit 104 is coupled to bus 102 for processing information and instructions. Computer system 100 can also include data storage features such as a computer usable volatile memory 106 (e.g., random access memory [RAM]) coupled to bus 102 for storing information and instructions for central processor unit 104, computer usable non-volatile memory 108 (e.g. read only memory [ROM]) coupled to bus 102 for storing static information and instructions for the central processor unit 104, and a data storage device 110 (e.g., a magnetic or optical disk and disk drive) coupled to bus 102 for storing information and instructions. Computer system 100 can also include an optional alphanumeric input device 112 including alphanumeric and function keys. Alphanumeric input device 112 is coupled to bus 102 for communicating information and command selections to central processor unit 104. Computer system 100 can also optionally include a cursor control device 114 coupled to bus 102 for communicating user input information and command selections to central processor unit 104. Computer system 100 also can include an optional display device 116 coupled to bus 102 for displaying information.

Optional display device 116 may be a liquid crystal device, cathode ray tube, or other display device suitable for creating graphic images and alphanumeric characters recognizable to a user. Optional cursor control device 114 allows the computer user to dynamically signal the two-dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well-suited to directing a cursor by other means such as, for example, voice commands.

With reference still to FIG. 1, significantly, a network interface card (NIC) 118 coupled to bus 102 is connected to a network 120 and controls the flow of information to and from NIC 118 over network 120. Incoming data packets arrive at NIC 118 via network 120 and are typically stored in memory of NIC 118 before being transferred to other hardware and software of computer system 100. In accordance with the present invention, NIC 118 is equipped with a remote wakeup function. Various known remote wakeup techniques may be used in accordance with the present invention. One such remote wakeup technique is the known Magic Packet technique utilizing the Wakeon LAN (local area network) standard. A more detailed discussion of NIC 118 in furtherance of the present invention is found below.

Figure 2:
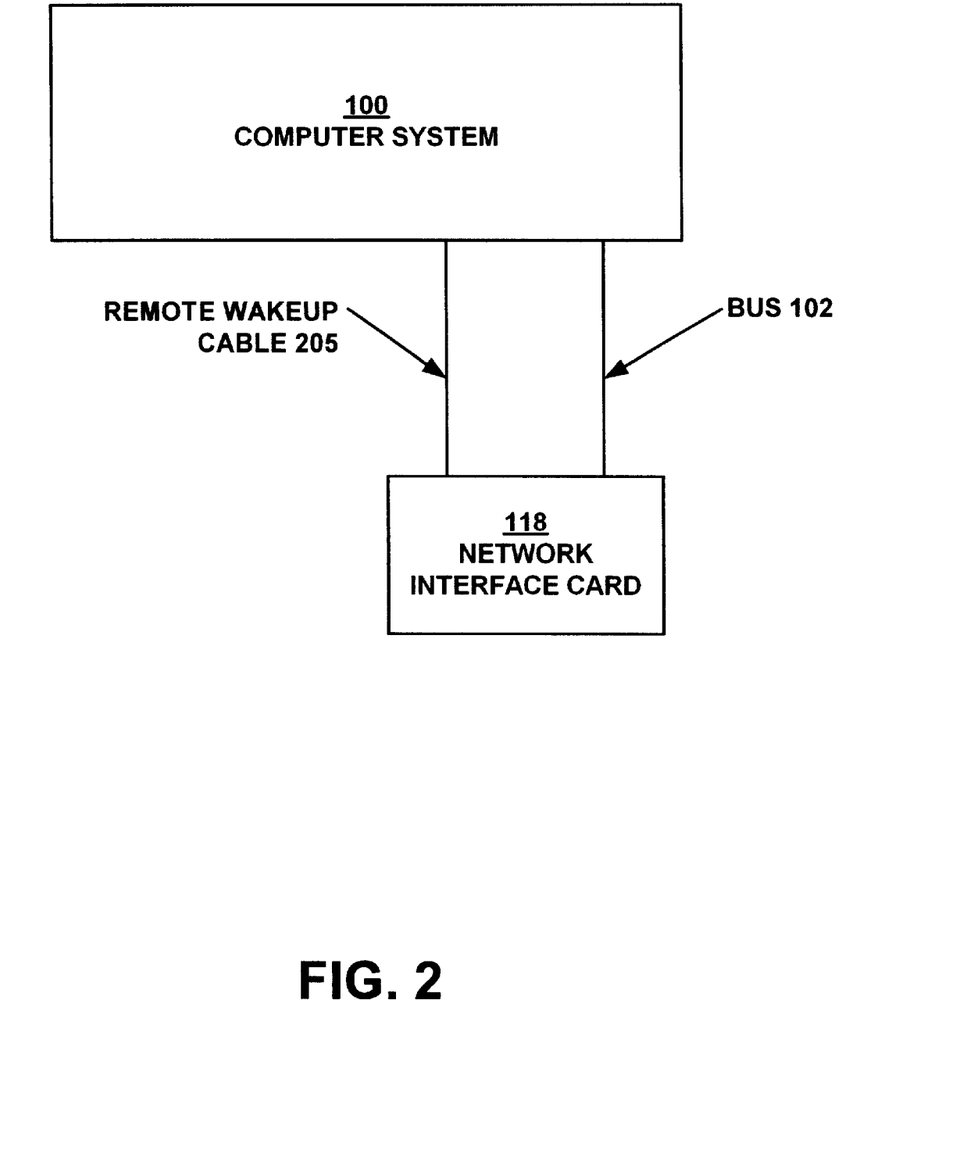
FIG. 2 is a block diagram showing a network interface card with remote wakeup capability connected to the computer system of FIG. 1 in accordance with one embodiment of the present invention.

Refer next to FIG. 2, which is a block diagram showing NIC 118 (with remote wakeup capability) connected to computer system 100 in accordance with the present embodiment of the present invention. NIC 118 is coupled to computer system 100 via bus 102 as described above. In one embodiment in which NIC 118 has remote wakeup capability, NIC 118 is also coupled to computer system 100 via remote wakeup cable 205.

In the present embodiment, bus 102 provides five volts (+5V) of power to NIC 118; in the discussion herein, this power is referred to as "primary power" or "+5V primary." The primary power is used to power NIC 118 when, for example, computer system 100 is powered on and not in the sleep mode, or when remote wakeup cable 205 is not attached.

When the remote wakeup function is present, +5V is also provided to NIC 118 using remote wakeup cable 205; in the discussion herein, this is referred to as "first auxiliary power" or "+5V auxiliary." The first auxiliary power is used to power NIC 118 when it is available. In other words, +5V auxiliary power supersedes the +5V primary power, and continues to be available when computer system 100 is in the sleep mode. In this manner, power remains available to NIC 118 so that it has the capability to wake up upon receiving a particular signal (e.g., a Magic Packet).

Additional auxiliary power of +3.3V can also be provided to NIC 118 via bus 102. For example, revision 2.2 of the PCI specification requires that +3.3V of auxiliary power be provided via pin A14 of bus 102. In the discussion herein, this is referred to as "second auxiliary power" or "+3.3V auxiliary." The +3.3V auxiliary power is not used if the +5V auxiliary power provided by the remote wakeup cable is available; that is, +3.3V auxiliary power is only used when computer system 100 is powered down without +5V auxiliary power.

Thus, NIC 118 has multiple power sources: for bus 102 substantially compliant with revision 2.1 of the PCI specification ("PCI 2.1"), NIC 118 (with remote wakeup capability) has at least two (2) power sources, and for bus 102 substantially compliant with revision 2.2 of the PCI specification, NIC 118 (with remote wakeup capability) has three (3) power sources. It is appreciated that additional power sources, or power sources of different voltages, may be utilized in accordance with the present invention. It is further appreciated that the present invention may be used when the remote wakeup cable is not present for PCI 2.1 or when the system is not compliant with revision 2.2 of the PCI specification, as will be seen. Thus, the present invention can be utilized with legacy devices.

Figure 3:
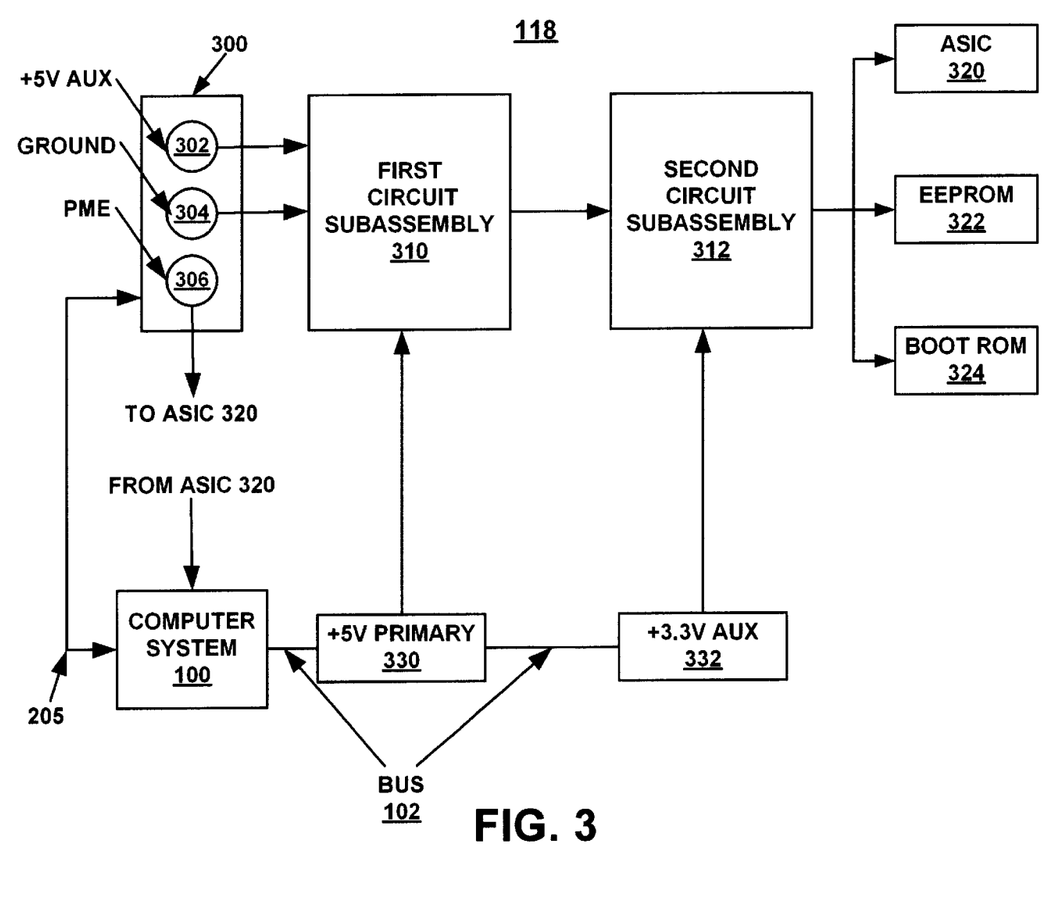
FIG. 3 is a block diagram of the network interface of FIG. 2 in accordance with one embodiment of the present invention.

FIG. 3 is a block diagram providing further details of NIC 118 in accordance with the present embodiment of the present invention. As described above, +5V primary power (330) and +3.3V auxiliary power (332) are provided to NIC 118 from computer system 100 via bus 102 for a system compliant with revision 2.2 of the PCI specification.

Also as described above, power for the remote wakeup function is provided to NIC 118 via remote wakeup cable 205. Remote wakeup cable 205 is connected to NIC 118 using connector 300. In the present embodiment, connector 300 is a 3-pin plug comprised of a first pin 302, a second pin 304 and a third pin 306. In this embodiment, first pin 302 provides +5V auxiliary power to NIC 118. Second pin 304 is a ground, and third pin 306 provides a power management event (PME) signal that is used to wake up computer system 100. In the present embodiment, third pin 306 (PME) is connected to application specific integrated circuit (ASIC) 320, which is prompted to wake up computer system 100 when NIC 118 receives a wakeup signal (such as a Magic Packet) (the connections from third pin 306 to ASIC 320 and from ASIC 320 to computer system 100 are not shown).

In accordance with the present invention, NIC 118 also includes first circuit subassembly 310 and second circuit subassembly 312 that are used for arbitrating between multiple power sources connected to NIC 118, thereby addressing power contention issues. First circuit subassembly 310 is used to arbitrate between the +5V primary power 330 and +5V auxiliary power 302, and provides +5V to second circuit subassembly 312. Second circuit subassembly 312 is used to arbitrate between the +5V from first circuit subassembly 310 and +3.3V auxiliary power 332 in accordance with the present invention. First circuit subassembly 310 and second circuit subassembly 312 are described below in conjunction with FIG. 4 and FIG. 5, respectively.

In addition to ASIC 320, NIC 118 can also include electrically erasable programmable ROM (EEPROM) 322 and boot ROM 324. In one embodiment, ASIC 320 includes a voltage regulator to convert voltage from +5V to 3.3V. This internal voltage regulator can regulate +5V to +3.3V, which can then be used to power EEPROM 322 and boot ROM 324 when +3.3V auxiliary power 332 is not available.

Figure 4:
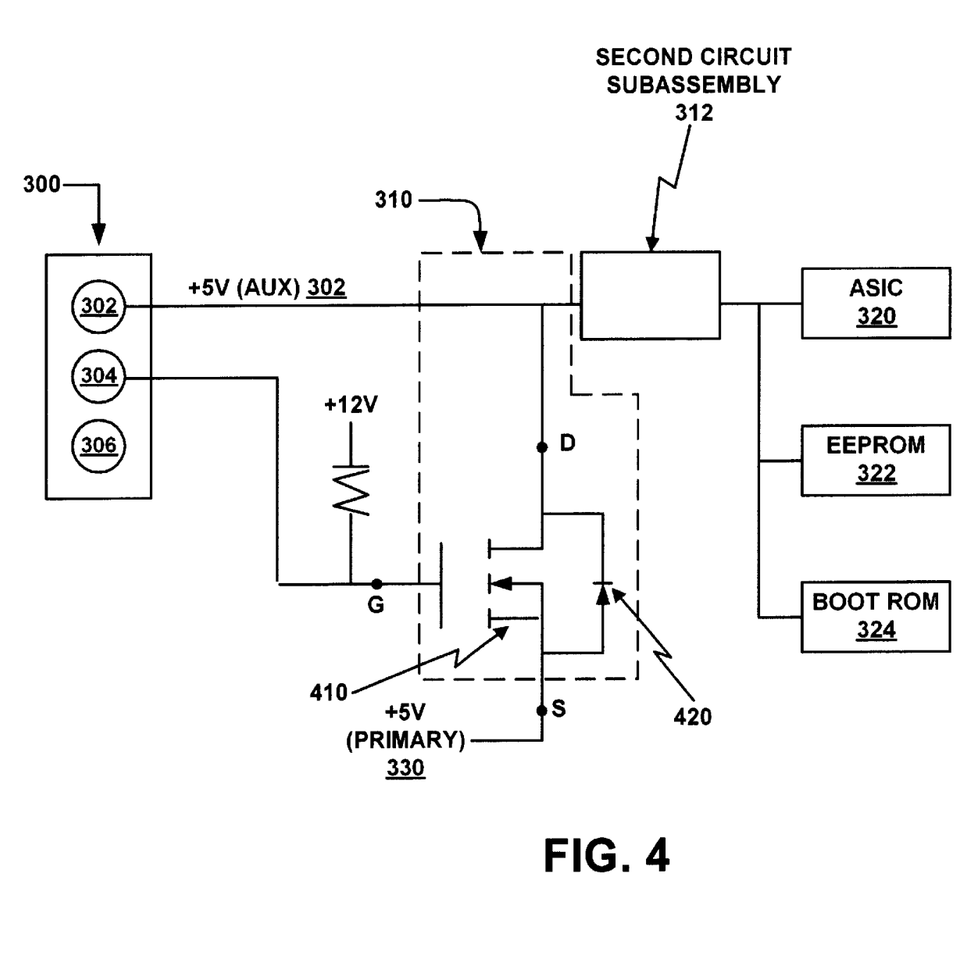
FIG. 4 is a schematic diagram of a first circuit subassembly used by the network interface card of FIG. 3 in accordance with one embodiment of the present invention.

FIG. 4 is a schematic diagram illustrating first circuit subassembly 310 in accordance with one embodiment of the present invention. First circuit subassembly 310 receives either +5V primary power 330 from bus 102 (FIG. 3) or +5V auxiliary power 302 from remote wakeup cable 205 (FIG. 3). In accordance with the present invention, first circuit subassembly 310 passes power from one source or the other but not both to second circuit subassembly 312, thereby addressing the potential power contention issue that would otherwise occur. In the present embodiment, first circuit subassembly 310 conducts the power from +5V auxiliary power 302 when that source of power is available (e.g., when NIC 118 has the remote wakeup function) even when +5V primary power 330 is available. If +5V auxiliary power 302 is not available (e.g., NIC 118 does not have the remote wakeup function), then +5V primary power 330 is used (when computer system 100 is powered on and not in the sleep mode).

Continuing with reference to FIG. 4, first circuit subassembly 310 includes a component (410) that conducts power (e.g., current) from +5V primary power 330 when +5V auxiliary power 302 is not present. In the present embodiment, component 410 is a transistor, specifically a n-channel field effect transistor (FET) (hereinafter, n-channel FET 410). Intrinsic to n-channel FET 410 is a diode 420. The orientation of n-channel FET 410 allows the intrinsic diode 420 to substantially prevent power (current) from flow from +5V auxiliary power 302 (when present) to +5V primary power 330. In the present embodiment, n-channel FET 410 is designed such that when $V_{GS}$ is greater than or equal to +5V, then n-channel FET 410 is on; otherwise, it is off. It is appreciated that n-channel FET 410 can be designed to be on/off for other values of $V_{GS}$ in accordance with the present invention.

In accordance with the present embodiment of the present invention, first circuit subassembly 310 works as follows. In the case in which both +5V auxiliary power 302 and +5V primary power 330 are present, NIC 118 will have remote wakeup capability and, accordingly, connector 300 including second pin 304 (ground) is also present. Thus, the +12 V source (from bus 102) is grounded and $V_{GS}$ is −5V (0 V at the gate [G] terminal and +5V at the source [S] terminal of n-channel FET 410). Consequently, n-channel FET 410 is off and power from +5V auxiliary power 302 is provided to second circuit subassembly 312. Diode 420 intrinsic to n-channel FET 410 protects +5V primary power 330 against back drive current from +5V auxiliary power 302.

In the case in which computer system 100 (FIG. 3) is powered down (e.g., the computer system is in the sleep mode), then only +5V auxiliary power 302 is available. As can be seen from FIG. 4, this power is provided to second circuit subassembly 312 directly, and no power will be available from +5V primary power 330. Diode 420 intrinsic to n-channel FET 410 protects +5V primary power 330 against back drive current from +5V auxiliary power 302.

In the case in which only +5V primary power 330 is present, NIC 118 does not have remote wakeup capability, and so connector 300 including second pin 304 (ground) is not present. Thus, $V_{GS}$ is +7V and consequently n-channel FET 410 is on. Power from +5V primary power 330 is then provided to second circuit subassembly 312. In this manner, the present invention can be implemented with legacy devices not equipped with the remote wakeup function.

In summary, in the present embodiment of the present invention, first circuit subassembly 310 gives precedence to +5V auxiliary power 302 when that source of power is available, and otherwise uses power from +5V primary power 330 when that source of power is available. It is appreciated that in other embodiments a different order may be used to assign precedence of one power source over another. In the manner described above, +5V is provided by first circuit subassembly 310 to second circuit subassembly 312.

Figure 5:
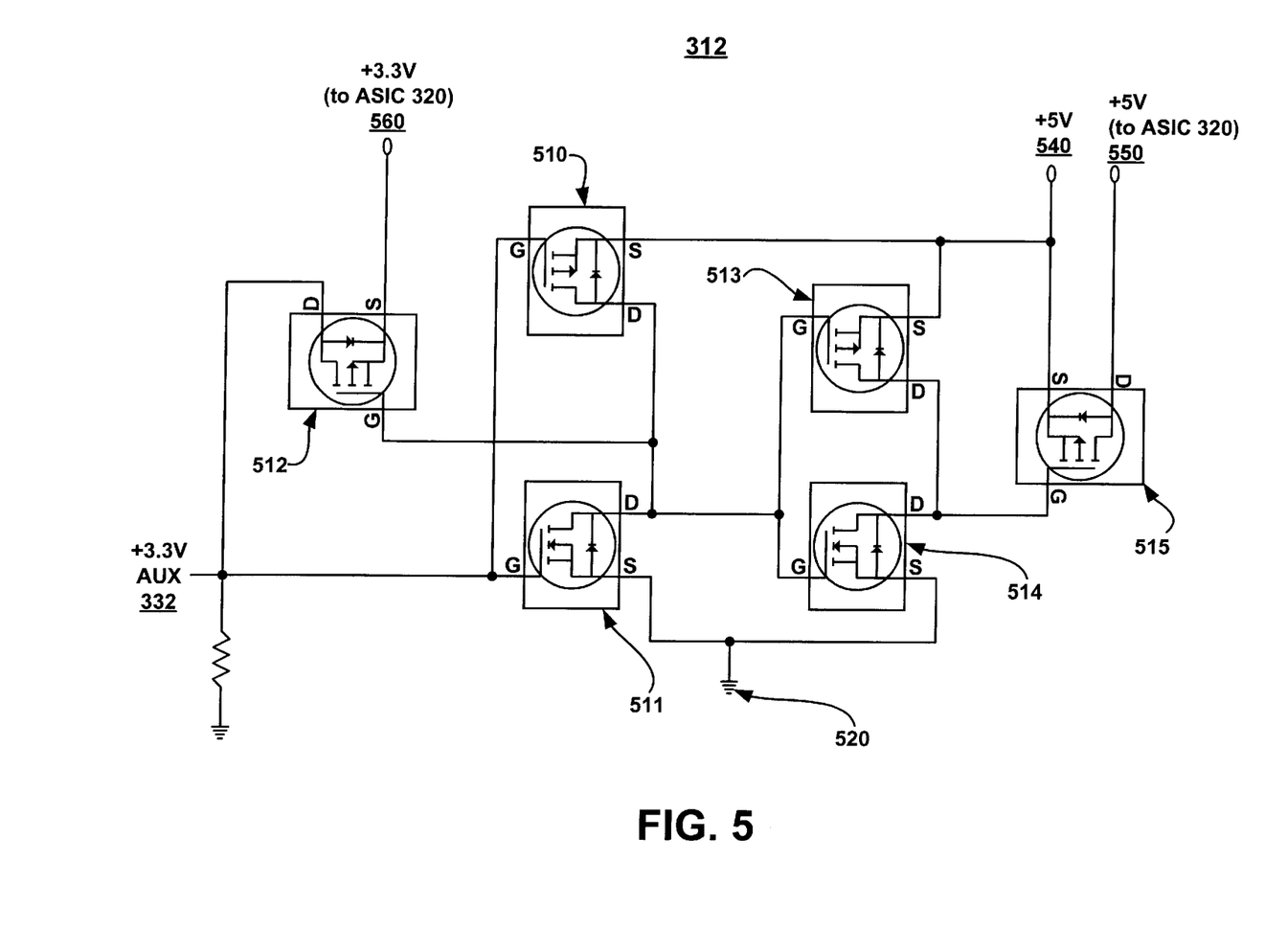
FIG. 5 is a schematic diagram of a second circuit subassembly used by the network interface card of FIG. 3 in accordance with one embodiment of the present invention.

FIG. 5 is a schematic diagram illustrating second circuit subassembly 312 in accordance with one embodiment of the present invention. In the present embodiment of the present invention, the +5V received by second circuit subassembly 312 from first circuit subassembly 310 can be from either +5V primary power 330 or +5V auxiliary power 302 (see discussion pertaining to FIG. 4). Second circuit subassembly 312 also receives +3.3V auxiliary power 332 from another power source (for example, from a PCI bus substantially compliant with revision 2.2 of the PCI specification).

In accordance with the present invention, second circuit subassembly 312 selects either +5V power 540 (from first circuit subassembly 310) or +3.3V auxiliary power 332 to power ASIC 320, thereby addressing the potential power contention issue that would otherwise occur. In the present embodiment, second circuit subassembly 312 selects +3.3V auxiliary power 332 when that source of power is available. In this case, +3.3V auxiliary power can be used to power ASIC 320 and other components such as EEPROM 322 and boot ROM 324. If that source of power is not available, second circuit subassembly 312 selects +5V power 540 from first circuit subassembly 310. In this case, ASIC 320 regulates the +5V to +3.3V, which can then be used to power ASIC 320 and other components such as EEPROM 322 and boot ROM 324. Because ASIC 320 will only receive either +5V to the input of its voltage regulator, or +3.3V to the output of its voltage regulator, there will not be any power contention between the +5V and +3.3V power sources.

Thus, in accordance with the present embodiment of the present invention, second circuit subassembly 312 gives precedence to +3.3V auxiliary power 332 when that source of power is available. It is appreciated that in other embodiments, a different order of precedence may be used.

With reference still to FIG. 5, in the present embodiment, second circuit subassembly 312 includes a plurality of components (510, 511, 512, 513, 514 and 515) that operate in combination to arbitrate between +5V power 540 from first circuit subassembly 310 and +3.3V auxiliary power 332. In the present embodiment, these components are transistors, specifically field effect transistors (FETs). In the present embodiment, transistors 510, 512, 513 and 515 are p-channel FETs, and transistors 511 and 514 are n-channel FETs. It is appreciated that in other embodiments a different number of FETs or different types of FETs may be used in accordance with the present invention.

It is well known in the art how p-channel FETs and n-channel FETs function. In general, when $V_{SG}$ is greater than or equal to a specified voltage, then a p-channel FET is on and will conduct current. Similarly, when $V_{GS}$ is greater than or equal to a specified voltage, then a n-channel FET is on and will conduct current.

In accordance with the present embodiment of the present invention, second circuit subassembly 312 works as follows. For the case in which both +5V power 540 from first circuit subassembly 310 and +3.3V auxiliary power 332 are available, transistor 510 will receive voltage from both of these power sources (at source S and gate G, respectively). However, $V_{SG}$ is not large enough to turn on transistor 510. Transistor 511 is on because gate G receives +3.3V from +3.3V auxiliary power 332 and zero voltage via transistor 510 (also, as will be seen, no voltage from transistor 514). Accordingly, $V_{GS}$ is large enough to turn on transistor 511.

Transistor 512 receives +3.3V from +3.3V auxiliary power 332, and zero voltage from transistors 510 and 511. Accordingly, transistor 512 is on, and therefore +3.3V power 560 is provided to ASIC 320 (FIG. 3).

Continuing with the case in which both +5V power 540 and +3.3V auxiliary power 332 are available, transistor 513 receives +5V at source S and zero voltage at gate G. Consequently, $V_{SG}$ is large enough to turn on transistor 513. Transistor 514 receives approximately +5V from transistor 513 (there may be a slight voltage drop across transistor 513), and zero voltage from transistors 510 and 511. Thus, transistor 514 is off. Transistor 515 receives +5V 540 and approximately +5V from transistor 513; however, $V_{GS}$ is not large enough to turn on transistor 515. Consequently, +5V power 540 is not provided to ASIC 320.

Continuing with reference to FIG. 5, for the case in which +5V power 540 is available and +3.3V auxiliary power 332 is not available, then transistor 510 receives zero voltage from +3.3V auxiliary power 332 at gate G and +5V from +5V power 540 at source S. Consequently, transistor 510 is on. Transistor 511 receives approximately +5V from transistor 510 and zero voltage from +3.3V auxiliary power 332, and consequently transistor 511 is off. Transistor 512 receives zero voltage from +3.3V auxiliary power 332 and approximately +5V from transistor 510, and consequently transistor 512 is also off. Transistor 513 receives +5V from +5V power 540 and approximately +5V from transistor 510. Consequently, transistor 513 is off. Transistor 514 receives approximately +5V from transistor 510 and zero voltage from transistor 513, and so transistor 514 is on. Transistor 515 receives zero voltage from transistor 513 and +5V from +5V power 540. Transistor 515 is on and therefore +5V power 550 is provided to ASIC 320.

Thus, in the present embodiment of the present invention, second circuit subassembly 312 provides +3.3V auxiliary power 332 to ASIC 320 when +3.3V auxiliary power 332 is available. If +5V power 540 is also available, then +3.3V auxiliary power 332 takes precedence in accordance with the present embodiment. If +3.3V auxiliary power 332 is not available, then +5V power 540 is used. In this case, +5V power 540 feeds directly to the input of the voltage regulator internal to ASIC 320. The +3.3V output of this internal voltage regulator can then be used to power other components such as EEPROM 322 and boot ROM 324.

Figure 6:
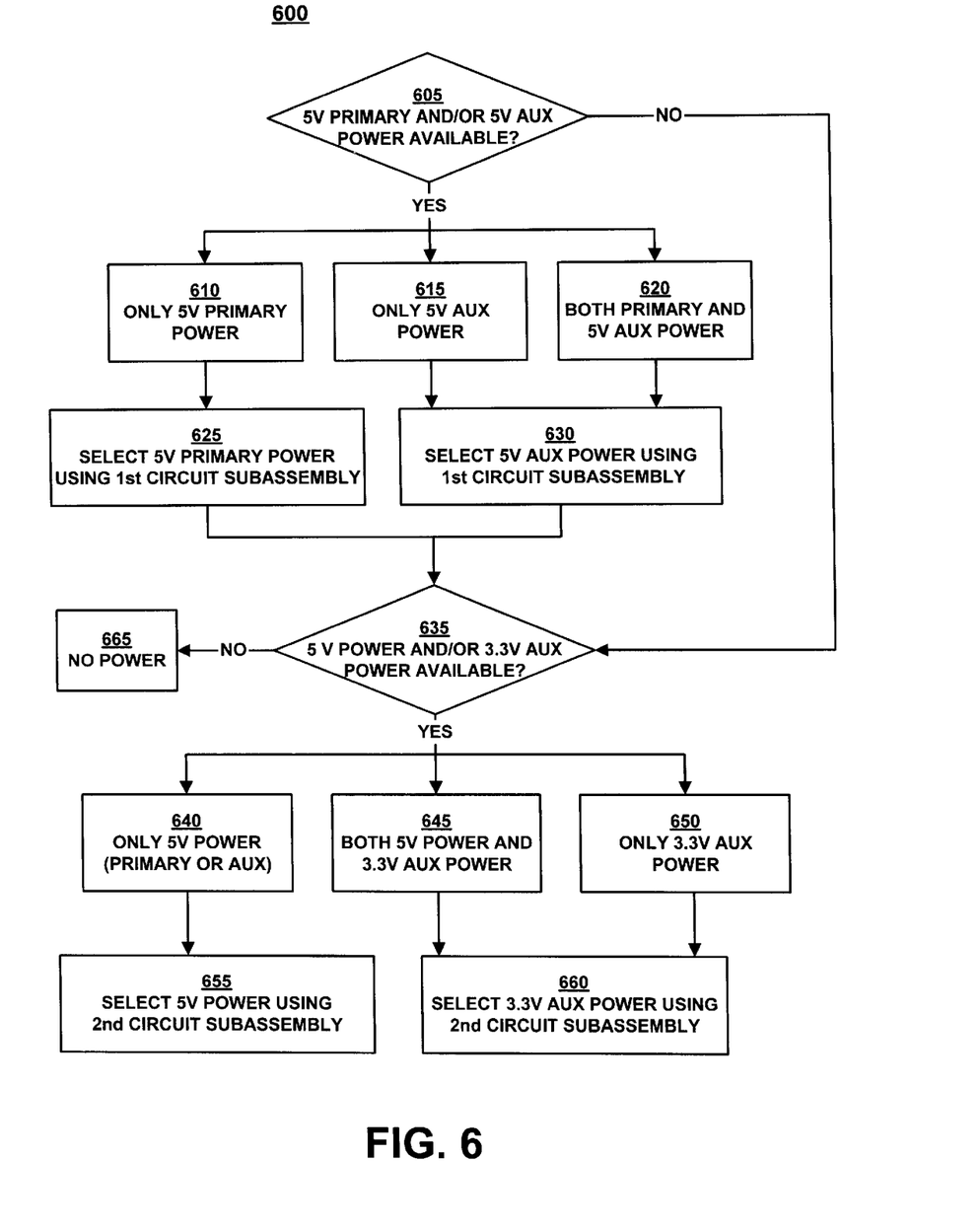
FIG. 6 is a flowchart of a process used to arbitrate between multiple power sources in accordance with one embodiment of the present invention.

FIG. 6 is a flowchart of process 600 used to arbitrate between a plurality of power sources connected to NIC 118 (FIG. 3) in accordance with one embodiment of the present invention. Process 600 can be implemented for devices (e.g., NIC 118) with or without remote wakeup capability and for devices that are or are not compliant with PCI specification revision 2.2. Thus, process 600 can be utilized with legacy devices.

Starting with step 605 of FIG. 6, in accordance with the present embodiment, power will be selectively conducted from either +5V primary power 330 (FIG. 4) or +5V auxiliary power 302 (FIG. 4) using first circuit subassembly 310 (FIG. 4).

In step 610 of FIG. 6, only +5V primary power 330 is available. In his case, NIC 118 does not have the remote wakeup function through cable 205 (FIG. 3) or, alternatively, cable 205 is not connected to connector 300 of FIG. 3.

In step 615 of FIG. 6, only +5V auxiliary power 302 is available. In this case, computer system 100 of FIG. 3 can be powered down and placed in sleep mode.

In step 620 of FIG. 6, both +5V primary power 330 and +5V auxiliary power 302 are available.

In step 625, from step 610, first circuit subassembly 310 selects +5V primary power 330 to power ASIC 320 (FIG. 3) as described above in conjunction with FIG. 4.

In step 630, from step 615 or step 620, first circuit subassembly 310 selects +5V auxiliary power 330 to power ASIC 320 as described above in conjunction with FIG. 4.

Starting with step 635 of FIG. 6, in accordance with the present invention, power will be selectively conducted from either +5V power 540 (FIG. 5) or +3.3V auxiliary power 332 (FIG. 5) using second circuit subassembly 312 (FIG. 5).

In step 640 of FIG. 6, only +5V power 540 is available. In this case, for example, NIC 118 is not compliant with revision 2.2 of the PCI specification.

In step 645, both +5V power 540 and +3.3V auxiliary power 332 are available.

In step 650, only +3.3V auxiliary power 332 is available.

In step 655, from step 640, second circuit subassembly 312 selects +5V power 540 to power ASIC 320 as described above in conjunction with FIG. 5.

In step 660, from step 645 or step 650, second circuit subassembly 312 selects +3.3V auxiliary power 332 to power ASIC 320 as described above in conjunction with FIG. 5.

In step 665, from step 635, if there is no +5V power source (either +5V primary or +5V auxiliary) or no +3.3V power source, then there is no power to the system.

In summary, the present invention provides a device and method thereof which address the power contention problem so that components do not inadvertently receive power from more than one source when multiple power sources are present in a peripheral device (such as a network interface card). The present invention also provides a device and method thereof which allow the peripheral device to select one power source versus another depending on the mode in which the computer and peripheral device are currently operating (e.g., sleep mode versus awake). The present invention can be used with devices that have the remote wakeup function and also with devices that are substantially compliant with revision 2.2 of the PCI specification. However, the present invention can also be used with legacy devices that do not have the remote wakeup function or are not compliant with revision 2.2 of the PCI specification.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A circuit for arbitrating between a plurality of power sources connected to a computer system peripheral device, said circuit comprising:

a first circuit subassembly coupled to a first power source and a second power source, said first circuit subassembly adapted to conduct current from said first power source when power is not available from said second power source and otherwise conduct current from said second power source; and a second circuit subassembly coupled between said first circuit subassembly and a third power source, said second circuit subassembly adapted to conduct current from said third power source when said third power source is available and otherwise conduct current from said first circuit subassembly, said second circuit subassembly comprising:

a first component coupled to said third power source and said first circuit subassembly, said first component adapted to conduct current from said first circuit subassembly when power is not available from said third power source and otherwise substantially not conduct current;

a second component coupled to said third power source and said first component, said second component adapted to conduct current from said first component when power is available from said third power source and otherwise substantially not conduct current; and a third component coupled to said first component, said second component and said third power source, said third component adapted to conduct current from said third power source when power is available from said third power source.

2. The circuit of claim 1 wherein said first component, said second component and said third component are transistors.

3. The circuit of claim 2 wherein said first component and said third component are p-channel field effect transistors (FETs) and said second component is a n-channel FET.

4. The circuit of claim 1 wherein said second circuit subassembly further comprises:

a fourth component coupled to said first component, said second component and said first circuit subassembly, said fourth component adapted to conduct current from said first circuit subassembly when power is available from said third power source and otherwise substantially not conduct current;

a fifth component coupled to said second component and said fourth component, said fifth component adapted to conduct current from said fourth component when power is not available from said third power source and otherwise substantially not conduct current; and a sixth component coupled to said fourth component and said first circuit subassembly, said sixth component adapted to conduct current from said first circuit subassembly when power is not available from said third power source and otherwise substantially not conduct current.

5. The circuit of claim 4 wherein said fourth component, said fifth component and said sixth component are transistors.

6. The circuit of claim 5 wherein said fourth component and said sixth component are p-channel FETs and said fifth component is a n-channel FET.

7. The circuit of claim 1 wherein said first circuit subassembly comprises:

a seventh component coupled between said first power source and said second power source, said seventh component adapted to conduct current from said first power source when said second power source is not available and to otherwise conduct power from said second power source; and an eighth component integral with said seventh component, wherein said eighth component is adapted to conduct current from said first power source in combination with said seventh component and to substantially prevent current from flowing from said second power source to said first power source.

8. The circuit of claim 7 wherein said seventh component is a transistor and said eighth component is a diode.

9. The circuit of claim 1 wherein said first power source is connected to said peripheral device via a PCI (peripheral component interconnect) bus and said second power source is connected to said peripheral device via a cable that provides a remote wakeup function.

10. The circuit of claim 1 wherein said third power source is connected to said peripheral device via a PCI bus substantially in accordance with PCI standard 2.2.

11. The circuit of claim 1 wherein said peripheral device is a network adapter.

12. A method for arbitrating between a plurality of power sources connected to a computer system peripheral device, said method comprising the steps of:
   a) selectively conducting current from a first power source when power is not available from a second power source and otherwise conducting current from said second power source using a circuit subassembly coupled to said first power source and said second power source;
   b) using a first component to conduct current from said circuit subassembly when power is not available from a third power source, said first component otherwise not substantially conducting current;
   c) using a second component to conduct current from said first component when power is available from said third power source, said second component otherwise not substantially conducting current; and
   d) using a third component to conduct current from said third power source when power is available from said third power source;
   wherein power is conducted from said third power source when power is available from said third power source and otherwise power is conducted from said circuit subassembly.

13. The method for arbitrating between a plurality of power sources as recited in claim 12 wherein said first component, said second component and said third component are transistors.

14. The method for arbitrating between a plurality of power sources as recited in claim 13 wherein said first component and said third component are p-channel field effect transistors (FETs) and said second component is a n-channel FET.

15. The method for arbitrating between a plurality of power sources as recited in claim 12 further comprising the steps of:
   e) using a fourth component to conduct current from said circuit subassembly when power is available from said third power source, said fourth component not otherwise substantially conducting current;
   f) using a fifth component to conduct current from said fourth component when power is not available from said third power source, said fifth component not otherwise substantially conducting current; and
   g) using a sixth component to conduct current from said circuit subassembly when power is not available from said third power source, said sixth component not otherwise substantially conducting current.

16. The method for arbitrating between a plurality of power sources as recited in claim 15 wherein said fourth component, said fifth component and said sixth component are transistors.

17. The method for arbitrating between a plurality of power sources as recited in claim 16 wherein said fourth component and said sixth component are p-channel FETs and said fifth component is a n-channel FET.

18. The method for arbitrating between a plurality of power sources as recited in claim 12 wherein step a) further comprises the steps of:
   a1) selectively conducting current from said first power source using a seventh component coupled between said first power source and said second power source; and
   a2) conducting current from said first power source and substantially preventing current from flowing from said second power source to said first power source using an eighth component integral with said seventh component;
   wherein power from said second power source is conducted when power is available from said second power source, and otherwise power from said first power source is conducted.

19. The method for arbitrating between a plurality of power sources as recited in claim 18 wherein said seventh component is a transistor and said eighth component is a diode.

20. The method for arbitrating between a plurality of power sources as recited in claim 12 wherein said first power source is connected to said peripheral device via a PCI (peripheral component interconnect) bus and said second power source is connected to said peripheral device via a cable that provides a remote wakeup function.

21. The method for arbitrating between a plurality of power sources as recited in claim 20 wherein said third power source is connected to said peripheral device via a PCI bus substantially in accordance with PCI standard 2.2.

22. The method for arbitrating between a plurality of power sources as recited in claim 12 wherein said peripheral device is a network adapter.

23. A circuit for arbitrating between a plurality of power sources connected to a computer system peripheral device, said circuit comprising:
   a first circuit subassembly coupled to a first power source and a second power source, said first circuit subassembly adapted to conduct current from said first power source when power is not available from said second power source and otherwise conduct current from said second power source; and
   a second circuit subassembly coupled between said first circuit subassembly and a third power source, said second circuit subassembly adapted to conduct current from said third power source when said third power source is available and otherwise conduct current from said first circuit subassembly, said second circuit subassembly comprising:
      a first transistor coupled to said third power source and said first circuit subassembly, said first transistor adapted to conduct current from said first circuit subassembly when power is not available from said third power source and otherwise substantially not conduct current;
      a second transistor coupled to said third power source and first transistor, said second transistor adapted to conduct current from said first transistor when power is available from said third power source and otherwise substantially not conduct current;
      a third transistor coupled to said first transistor, said second transistor and said third power source, said third transistor adapted to conduct current from said third power source when power is available from said third power source;

a fourth transistor coupled to said first transistor; said second transistor and said first circuit subassembly, said fourth transistor adapted to conduct current from said first circuit subassembly when power is available from said third power source and otherwise substantially not conduct current;

a fifth transistor coupled to said second transistor and said fourth transistor, said fifth transistor adapted to conduct current from said fourth transistor when power is not available from said third power source and otherwise substantially not conduct current; and a sixth transistor coupled to said fourth transistor and said first circuit subassembly, said sixth transistor adapted to conduct current from said first circuit subassembly when power is not available from said third power source and otherwise substantially not conduct current.

24. The circuit of claim 23 wherein said first power source is connected to said peripheral device via a PCI (peripheral component interconnect) bus, said second power source is connected to said peripheral device via a cable that provides a remote wakeup function, and said third power source is connected to said peripheral device via a PCI bus substantially in accordance with PCI standard 2.2.

25. The circuit of claim 23 wherein said peripheral device is a network adapter.

26. The circuit of claim 23 wherein said first circuit subassembly comprises:

a seventh transistor coupled between said first power source and said second power source, said seventh transistor adapted to conduct current from said first power source when said second power source is not available and to otherwise conduct power from said second power source; and a diode integral with said seventh transistor, wherein said diode is adapted to conduct current from said first power source in combination with said seventh transistor and to substantially prevent current from flowing from said second power source to said first power source.

* * * * *